US005818851A

United States Patent [19]

Memmler et al.

[11] Patent Number: 5,818,851

[45] Date of Patent: Oct. 6, 1998

[54] METHOD FOR DETECTING THE TIME MESSAGES IN THE FAULTY SIGNAL OF A TIME-SIGNAL TRANSMITTER

[75] Inventors: Bernd Memmler, Rosengarten-Rieden; Gerhard Schäfer, Weinsberg, both of Germany

[73] Assignee: Temic Telefunken microelectronic GmbH, Heilbronn, Germany

[21] Appl. No.: 631,376

[22] Filed: Apr. 12, 1996

[30] Foreign Application Priority Data

Apr. 13, 1995 [DE] Germany ........................ 195 14 030.3

[51] Int. Cl.[6] ........................... G06F 11/00; G04C 11/02; H04L 1/00

[52] U.S. Cl. .............................. 371/30; 368/47; 968/907; 968/922

[58] Field of Search ................................ 371/30; 368/47; 375/356; 968/907, 922

[56] References Cited

U.S. PATENT DOCUMENTS 4,768,178 8/1988 Conklin et al. ........................... 368/47
4,823,328 4/1989 Conklin et al. ........................... 368/47
5,528,560 6/1996 Ogiyama .................................. 368/47

FOREIGN PATENT DOCUMENTS 0656572 6/1995 European Pat. Off. .
3733965 4/1989 Germany .

*Primary Examiner*—Paul P. Gordon
*Assistant Examiner*—Robert J. Dolan
*Attorney, Agent, or Firm*—Spencer & Frank

[57] ABSTRACT

A method is described for detecting the time messages in the faulty signal of a time-signal transmitter comprising the steps below. Probabilities are assigned to the received information/bits as they are received and whose sign specifies the value of the bit and whose numerical value indicates the certainty of reception. Except for the bits designating the minute information, the probabilities of successive time messages are totaled with time correctness in a one-dimensional memory field. From the totaled probabilities, a reduced time message is reconstructed that initially contains no information on the minutes. If the reconstructed time message does not change over two successive time intervals, and if preset minimum values for the number of probabilities are exceeded for all bits, then the reduced time message is recognized as being correct. The minutes are determined separately and added to the time message recognized as being correct.

2 Claims, 2 Drawing Sheets

DECODED MINUTE INFORMATION

REFERENCE BIT PATTERN

DECI:

(BCD-CODE) DECI:

| 40 | 20 | 10 | 8 | 4 | 2 | 1 | | 40 | 20 | 10 | 8 | 4 | 2 | 1 | |
|---|---|---|---|---|---|---|---|---|---|---|---|---|---|---|---|
| | | | | | | | | | | | | | | | |
| 0 | 0 | 0 | 1 | 0 | 0 | 0 | 8 | 0 | 0 | 0 | 0 | 0 | 0 | 0 | 0 |
| 0 | 0 | 0 | 1 | 0 | 0 | 1 | 9 | 0 | 0 | 0 | 0 | 0 | 0 | 1 | 1 |
| 0 | 0 | 1 | 0 | 0 | 0 | 0 | 10 | 0 | 0 | 0 | 0 | 0 | 1 | 0 | 2 |
| 0 | 0 | 1 | 0 | 0 | 0 | 1 | 11 | 0 | 0 | 0 | 0 | 0 | 1 | 1 | 3 |
| | | | | | | | | 0 | 0 | 0 | 0 | 1 | 0 | 0 | 4 |
| | | | | | | | | 0 | 0 | 0 | 0 | 1 | 0 | 1 | 5 |
| | | | | | | | | 0 | 0 | 0 | 0 | 1 | 1 | 0 | 6 |
| | | | | | | | | 0 | 0 | 0 | 0 | 1 | 1 | 1 | 7 |
| | | | | | | | | 0 | 0 | 0 | 1 | 0 | 0 | 0 | 8 |
| | | | | | | | | 0 | 0 | 0 | 1 | 0 | 0 | 1 | 9 |
| | | | | | | | | 0 | 0 | 1 | 0 | 0 | 0 | 0 | 10 |
| | | | | | | | | 0 | 0 | 1 | 0 | 0 | 0 | 1 | 11 |
| | | | | | | | | 0 | 0 | 1 | 0 | 0 | 1 | 0 | 12 |
| | | | | | | | | | | | | | | | |

FIG. 2

METHOD FOR DETECTING THE TIME MESSAGES IN THE FAULTY SIGNAL OF A TIME-SIGNAL TRANSMITTER

BACKGROUND OF THE INVENTION

The invention relates to a method for detecting time messages contained in the faulty signal received from a time-signal transmitter, where probabilities are assigned to the received information/bits as they are received and whose sign specifies the value of the bit and whose numerical value indicates the certainty of reception.

In DE 37 33 965 A1, a method is described for recovering information from faulty data sent by a time-signal transmitter, where the signal is evaluated by means of a protocol field. The received time messages, each of which exists for one minute from the series of bits, are stored in a memory field made up of 60 columns and x rows. One row is provided in the memory field for each time message. To obtain correct data, the time messages stored in the protocol field are then grouped together and evaluated in such a way that the data stands out from the faults. Since the minutes change with each time message, it is proposed in the known method that the bit values of the lowest significant place of the hours be compared with those of the minutes with pattern functions that can be calculated in advance. Furthermore, it is proposed that the entries made in the protocol field be weighted with a value for their certainty of reception. The intention of this is to obtain faster convergency of the probability with which a time message is identified correctly. The signal-to-noise ratio is given as quality criterion for the weighting.

The known method requires a large memory area in order to create the protocol field. This high memory capacity requirement, which in turn calls for a high computing power, increases even further if an additional value is needed for the certainty of reception of every entry in the protocol field. If the certainty of reception is to be specified with a high resolution, even more memory is needed. Furthermore, the amount of computation for placing the values of the proposed 400 entries in the protocol field is impractical. The time taken to display a time of day is accordingly high.

SUMMARY OF THE INVENTION

The object of the invention is therefore to provide a suitable method that requires only little memory space and permits faster evaluation.

The method for detecting the time messages in the faulty signal of a time-signal transmitter comprises the steps enumerated below. Probabilities are assigned to the received information/bits as they are received and whose sign specifies the value of the bit and whose numerical value indicates the certainty of reception. Except for the bits designating the minute information, the probabilities of successive time messages are totaled with time correctness in a one-dimensional memory field. From the totaled probabilities, a reduced time message is reconstructed that initially contains no information on the minutes. If the reconstructed time message does not change over two successive time intervals, and if preset minimum values for the number of probabilities are exceeded for all bits, then the reduced time message is recognized as being correct.

The minutes are determined by comparison with a table with pattern functions and added to the time message recognized as being correct. The distinctive feature of this method is that even time messages with serious errors are detected quickly and with certainty. Only a small amount of main memory space is required and implementation is therefore possible even in the smallest of radio-controlled clocks.

BRIEF DESCRIPTION OF THE DRAWINGS

FIG. 2 shows an example for decoding the minute information by means of reference bit patterns.

DESCRIPTION OF THE PREFERRED EMBODIMENTS

Figure 1:
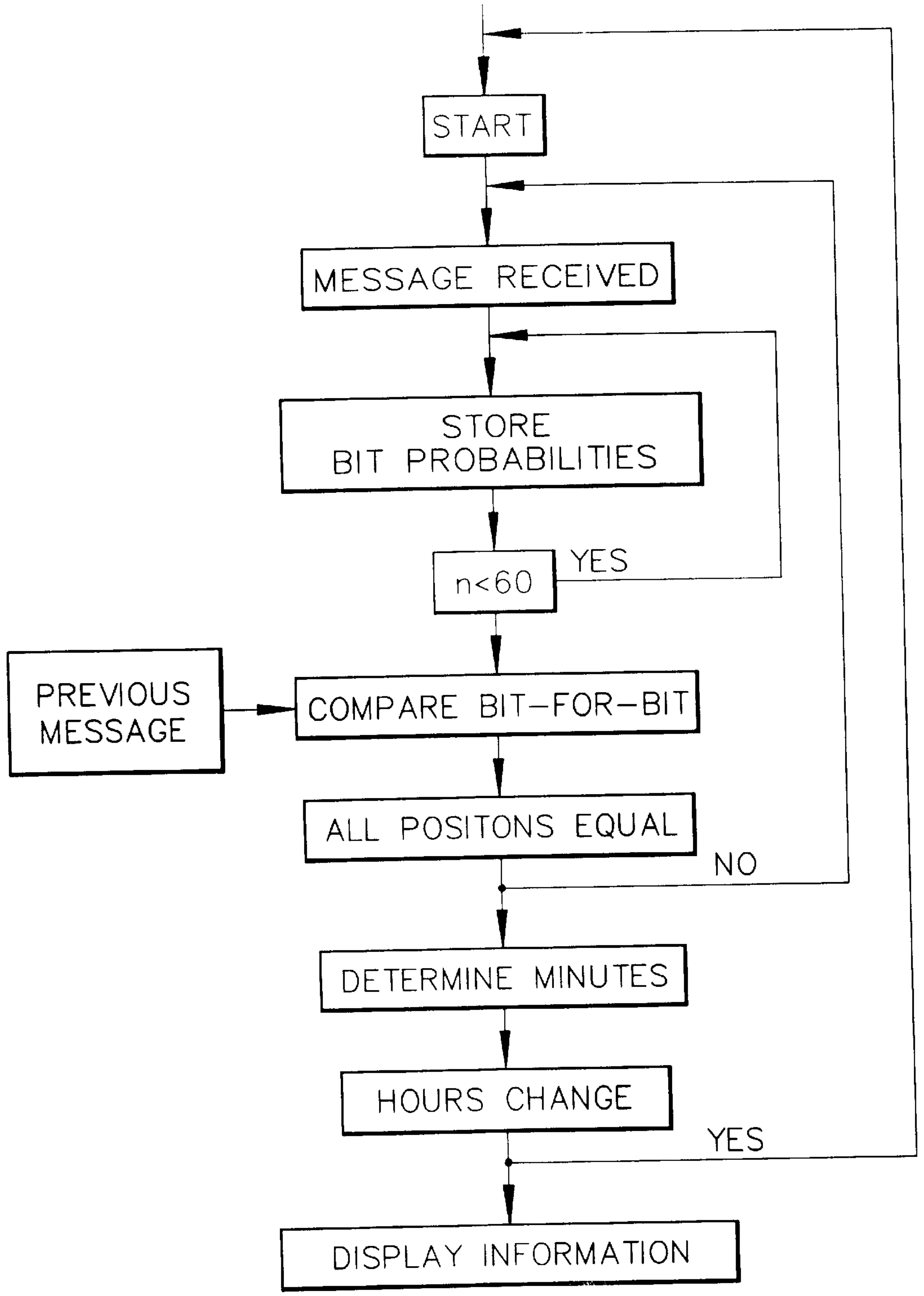
FIG. 1 is a flowchart for the method according to the invention.

An example of an embodiment of the invention will now be described with reference to the figures.

FIG. 1 shows a flowchart for the method. First of all, when a message is received, a probability is determined for the certainty of reception of each bit. Detection of the individual bits and the assignment of the corresponding probabilities is carried out, for example, in accordance with the method described in DE 44 27 885, corresponding to allowed U.S. patent application Ser. No. 08/508,185 by calculating area equivalents.

Sixty bits are always grouped together to form a complete time message. Within the signal, it is necessary to determine the beginning of the time message. The beginning is identified in the protocol of the time-signal transmitter DCF 77 of the Physikalisch Technische Bundesanstalt by omitting a seconds lowering. Protocols of other time-signal transmitters employ other methods to identify the beginning of a time message. Therefore, different procedures are necessary in order to register the beginning of the time message. They must be designed to suit the particular time-signal transmitter to be received.

In successive time messages, only the data relating to the minutes differ, as long as the hour does not change. The remaining information is the same, i.e. essentially the same information is contained in the equivalent bit positions of two successive time messages. If the information content changes, then at least one bit in the two successive time messages is erroneous.

If the bit positions at which the information content changes in two such successive time messages are compared with one another, the information content can be reconstructed on the basis of the assigned weighting numbers. The information for which the weighting number shows a higher probability is taken to be probably correct. The bit positions at which the minutes are coded are excluded from this correction because at least the bit for the smallest position changes in each time message.

To improve the error reduction even further, the weighting numbers are totaled in the field in the course of several time messages. This makes it possible to determine the information content of each individual bit with even greater reliability without a protocol field of greater size being necessary for the storage of the relevant time messages.

In an autonomous radio-controlled clock, the received time is not constantly displayed. Instead, an internal quartz clock is displayed which is synchronized at given time intervals with the time-signal transmitter. It is particularly important to synchronize the internal quartz clock with the received time only when there is a high probability that a time message has been reconstructed without error. Decoding of the information can therefore be stopped only when the reliability of the decoded bits is determined with a high degree of certainty. This reliability is determined by comparing with the information obtained one minute earlier. The bit information of the previous time message is stored and compared with the actual information. If the individual bits correspond and if all probability values exceed a minimum value, then the time message has been identified correctly with a sufficiently high degree of probability.

Because the transmitted information for the actual minute changes constantly due to the averaging over several minutes, the minute cannot be extracted by averaging the bit information. To extract the minute information, the minute bits are recorded for every minute transmitted.

To determine the actual minute, a reference bit pattern (BCD code table) is shifted over the decoded minute information. This takes place until a maximum agreement can be detected between reference bit pattern and the minute information; for instance, by comparing bit for bit. In order to improve the accuracy, the minute bits of several successive time messages are grouped together and compared jointly with the reference bit pattern.

FIG. 2 shows an example for determining the actual minute. The BCD-coded bit sequences for the successive minutes 8 to 11 are grouped together in one block as decoded minute bits. This block is now shifted over the reference bit pattern until the bit-for-bit comparison yields maximum agreement. Depending on the development of the method, either the first or the last value of the block is output as response. In the example shown, this would be either 8 or 11.

This method allows the actually valid minute to be extracted even if individual bits have been detected incorrectly because the time interval between entering in the field and the actual time is always known.

What is claimed is:

1. Method for detecting time messages contained in the faulty signal received from a time-signal transmitter, with the following steps:

probabilities are assigned to the received information/bits as they are received and whose sign specifies the value of the bit and whose numerical value indicates the certainty of reception;

except for the bits designating the minute information, the probabilities of successive time messages are totaled with time correctness in a one-dimensional memory field;

from the totaled probabilities, a reduced time message is reconstructed that initially contains no information on the minutes;

if the reconstructed time message does not change over two successive time intervals, and if preset minimum values for the number of probabilities are exceeded for all bits, then the reduced time message is recognized as being correct;

the minutes are determined separately and added to the time message recognized as being correct.

2. Method in accordance with claim 1, wherein the minutes are determined by comparison with a table with pattern functions.

* * * * *